Sept. 4, 1956     S. B. STEGER     2,761,785
FROZEN FOOD PACKAGE
Filed March 19, 1956
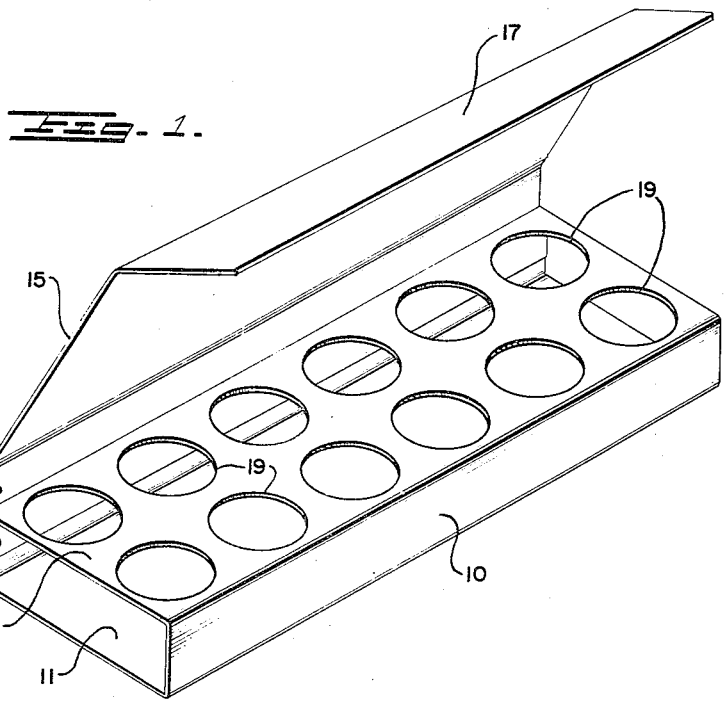
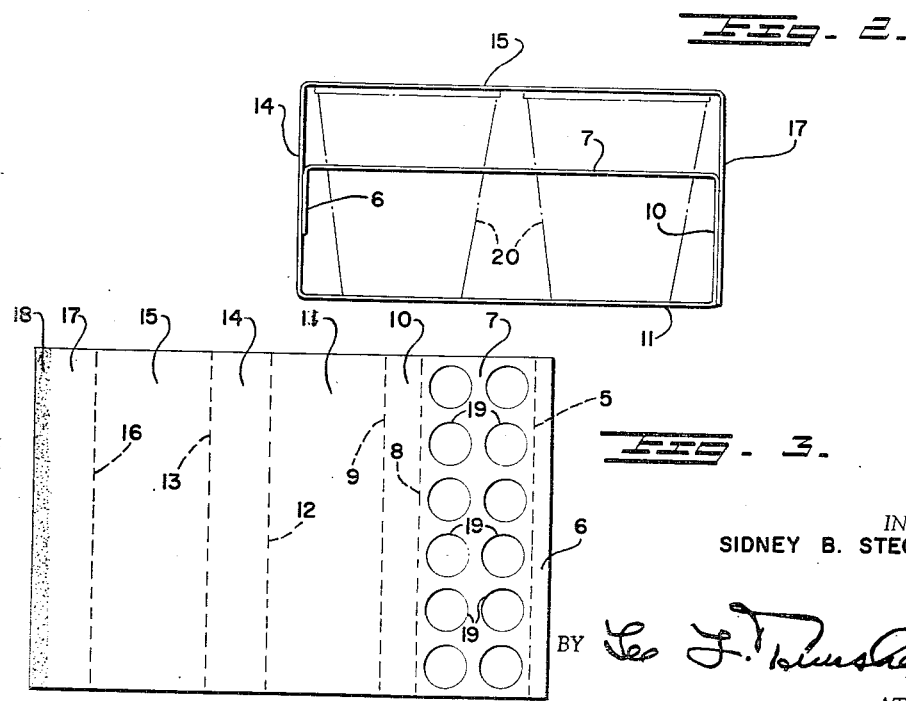
*INVENTOR*
SIDNEY B. STEGER
*ATTORNEY*

United States Patent Office 2,761,785
Patented Sept. 4, 1956

2,761,785

FROZEN FOOD PACKAGE

Sidney B. Steger, Richmond, Va.

Application March 19, 1956, Serial No. 572,533

1 Claim. (Cl. 99—180)

The present invention relates to facilities for the processing and handling of packages of frozen foods, particularly ice cream, plain sherbet, ice milk, frozen custard or the like, which are retailed in sealed paper cups, and which are maintained under sub zero cold storage until dispensed.

Under present standard manufacturing procedures the mix is prepared first as a semi-frozen slurry and charged into the cups which then are sealed and conveyed to a hardening room. In the hardening room they are brought to fully frozen condition, after which the cup packages are stored under sub zero temperature until dispensed to the trade. Such procedure involves several distinct steps and multiple separate handlings which are factors that influence manufacturing costs and profits at source. Additionally, under present procedures, the sealed cups are hand-packed in lots in conventional pasteboard pie or cake boxes for storage and distribution to the trade. The thermal insulation of the closed box material necessitates the maintenance in the cold storage chamber of a much lower, and therefore more costly, refrigeration temperature than would be necessary if the packages were individually exposed on all sides to the free circulation of refrigerated air. Furthermore, the retailer is burdened with the time and expense incident to opening the boxes, removing the cups and placing them in his own cold storage chest, and disposing of the empty boxes.

In the manufacturer's cold storage room, under present standard procedure, the conventional cake or pie boxes containing the sealed cups are stacked in tiers in direct top and bottom surface contact. The tops of the boxes are closed and secured before they are placed in the cold storage room, which means that air at the ambient temperature and humidity at the time and place of closing is trapped within each box. In each box of cups the temperature and humidity of the entrapped air are higher than they are in the ambient air within the storage room; so that a differential exists. Also, there is a temperature and humidity differential between the contents of each cup and the air within the closed box. In addition, there exists a compounding differential between the two differentials of cup-within-box and box-within-room. It is known in refrigeration engineering that when two enclosed spaces are separated by a wall or membrane that is pervious to water vapor there ensues a transfer of water vapor through the wall from the space of higher temperature and humidity to the lower, so that the wall material takes up water vapor. In the case of poorly or imperfectly waterproofed cups the transfer is relatively fast and, in time, the water vapor accumulated within the air space of the closed pasteboard box travels through the box walls to the air space of the cold storage room. When boxes of cups are taken from cold storage for distribution to the trade they are inevitably exposed at one or more points and for varying periods of time to atmospheric temperature, and the consequent sharp differential between the atmospheric temperature and the temperature of the box walls causes condensation of the existing wall vapor content, with the result that the box walls may become soggy and flabby aside from and in addition to the effect of surface condensation of moisture from the surrounding atmosphere. This condition is objectionable from the retailer's point of view, as it carries an implication that the cups may not themselves be in properly frozen condition, and it may be the cause of rejects, to say nothing of the difficulties which might arise in handling.

An object of the present invention is to provide a novel carton which in use eliminates a number of the separate handling steps incident to present standard procedure, by serving the multiple functions of a cup charging rack, a cold storage cup lot holder, a trade distribution carton, and a disposable retailers' display rack.

A corollary object is to provide a cold storage carton for frozen food packages, capable of stacking in tiers of superposed units in a cold storage room, in which the absorption of water vapor by the body of the carton as the result of temperature and humidity differentials is impossible.

A further object is to provide a cold storage carton designed to encompass a predetermined lot of frozen food packages in such manner that the body of the carton itself is incapable of preventing or obstructing the free circulation of refrigerated air therethrough from end to end in contact with all sides of the packages at all times.

Other and incidental objects will be apparent from the following description taken in conjunction with the accompanying drawing, in which:

Figure 1 is a perspective view of the carton with cover opened;

Figure 2 is an end elevation thereof; and

Figure 3 is a plan view of the blank from which the carton was formed.

The carton is constructed from a one piece oblong rectangular blank as shown in Figure 3. The blank is provided with fold lines perpendicular to its side edges appropriately spaced to provide the desired number of sections for the finished carton. Inwardly from one end of the blank and parallel thereto the fold line 5 defines with the adjacent end edge of the blank an attaching flap 6. The fold line 5 also defines one edge of a rectangular section 7 of which the other edge is defined by another fold line 8. Inwardly from the line 8 there is provided a third fold line 9 which cooperates with the line 8 in spaced relation therefrom to define a front wall portion 10 which is substantially twice the width of the portion 6 as measured on the longitudinal median of the blank. The fold line 9 also defines the forward edge of a bottom section 11 of which the rear edge is defined by a fourth fold line 12. A fifth fold line 13 spaced from the line 12 defines a rear wall portion 14 which is twice the width, measured longitudinally of the blank, of the front wall portion 10. The line 13 also defines the rear edge of a cover section 15 corresponding in width to the bottom section 11. The front edge of the cover section is defined by a sixth line of fold 16 and the portion of the blank between the line 16 and its adjacent end edge constitutes a closure flap 17 which is identical in width to the rear wall portion 14. Preferably the edge area of the closure flap 17 is provided with adhesive 18 by which the carton may be sealed closed.

The rectangular section 7 is provided with an appropriate number of cup positioning circular openings 19. As here shown these openings are twelve in number arranged as two parallel rows extending transversely across the blank between its side edges. These openings are of appropriate size to receive the cups 20 and retain them in properly spaced relation within the confines of the carton, as shown in Figure 2.

In service, the blank is set up by bending the various sections along the indicated fold lines to assume the open top position of Figure 1. It is preferred that the portion 6 be adhesively secured to the rear wall 14 so that the planar rack portion 7 occuplies a plane parallel to the top and bottom and thus provides a relatively rigid reinforcement for the front and rear walls. However, as the rack portion is primarily a spacer means for positioning the cups in properly spaced relation it can be left free if desired because when the top 15 is lowered and the closure flap 17 is secured to the front wall portion 10 the parts are held in place.

In use, cartons in accordance with this invention are placed end to end on a traveling conveyor with their tops 15 and closure flaps 17 folded back at the rear. The planar rack 7 of each is then loaded with the requisite number of open top cups which seat on the bottom 11 in mutually spaced relation. At another point along the conveyor flight each cup is charged with semi-frozen mix and then top sealed, after which the top 15 is closed down over the charged cups and the closure flap sealed to the front wall portion 10, with the edge of the flap coincident to the carton bottom. The flap 17 then constitutes a closed front wall equal in dimensions to the closed rear wall 14. The rack 7 reinforces both the front and rear walls. Both ends of the carton remain entirely open and unobstructed in any way, so that it is impossible for air to be entrapped within the carton to give rise to temperature and humidity differentials. The loaded cartons are then carried on the conveyor into the hardening room and, after a predetermined period of processing therein, are stacked in tiers in a cold storage room maintained at sub zero temperature. By reason of the open ended construction of the cartons their interiors are fully open at all times to the unimpeded circulation of the cold storage room air and all sides of the charged cups are fully exposed to the refrigerated air at all times.

I claim:

A frozen food package consisting of a plurality of filled and closed cups containing partly frozen confection material enclosed in an open ended carton, said cups each having a flat bottom and a flat top, and the carton enclosing the same consisting solely of a front wall of less height than said cups, a flat bottom wall upon which the cups are seated, a rear wall extending higher than the cups, a flat top thereon folded down into planar engagement with the tops of the cups, a front flap on said top having its outer edge portion engaged with the face of the front wall, and a cross planar perforated rack integral with and extending from the top of the front wall across the carton in a single plane and engaged with the rear wall, each perforation having a cup therein, whereby when filled and closed the carton has sufficient rigidity for stacking with other cartons under refrigerating temperatures and the open ends of the filled carton permit a continuous end to end free circulation of refrigerated air through the carton and around the walls of each cup.

References Cited in the file of this patent

UNITED STATES PATENTS

| | | |
|---|---|---|
| 219,273 | King | Sept. 2, 1879 |
| 930,890 | Schlappich | Aug. 10, 1909 |
| 1,367,174 | Botnen | Feb. 1, 1921 |
| 1,522,325 | Pitts | Jan. 6, 1925 |
| 2,259,822 | Kienlen | Oct. 21, 1941 |
| 2,722,365 | Phipps | Nov. 1, 1955 |

FOREIGN PATENTS

| | | |
|---|---|---|
| 102,744 | Great Britain | Jan. 3, 1917 |